US010757093B1

(12) United States Patent
Salinas et al.

(10) Patent No.: US 10,757,093 B1
(45) Date of Patent: Aug. 25, 2020

(54) IDENTIFICATION OF RUNTIME CREDENTIAL REQUIREMENTS

(71) Applicant: Splunk Inc., San Francisco, CA (US)

(72) Inventors: Govind Salinas, Sunnyvale, CA (US); Sourabh Satish, Freemont, CA (US); Robert John Truesdell, Wexford, PA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 16/119,984

(22) Filed: Aug. 31, 2018

(51) Int. Cl.
*H04L 29/06* (2006.01)
(52) U.S. Cl.
CPC .......... *H04L 63/083* (2013.01); *H04L 63/105* (2013.01)
(58) Field of Classification Search
CPC .............................. H04L 63/083; H04L 63/105
USPC ............................................................ 726/6
See application file for complete search history.

(56) References Cited

U.S. PATENT DOCUMENTS

| | | | | |
|---|---|---|---|---|
| 2010/0205583 | A1* | 8/2010 | Gebhardt | G06F 11/366 717/127 |
| 2012/0079272 | A1* | 3/2012 | Tolle | G06F 3/04847 713/168 |
| 2012/0110330 | A1* | 5/2012 | Dickgiesser | H04L 9/3271 713/168 |
| 2013/0124807 | A1* | 5/2013 | Nielsen | G06F 11/1438 711/162 |
| 2015/0121523 | A1* | 4/2015 | Crowley | G06Q 10/06 726/23 |

\* cited by examiner

*Primary Examiner* — Teshome Hailu
(74) *Attorney, Agent, or Firm* — Nicholson De Vos; Webster & Elliott LLP

(57) ABSTRACT

Described herein are systems, methods, and software to enhance incident response in an information technology (IT) environment. In one example, an incident service identifies a course of action to respond to an incident in the IT environment. The incident service further identifies a particular step in the course of action associated with a credential requirement based on traits associated with the particular step, and generates a credential request to obtain credentials to support the credential requirement.

30 Claims, 7 Drawing Sheets

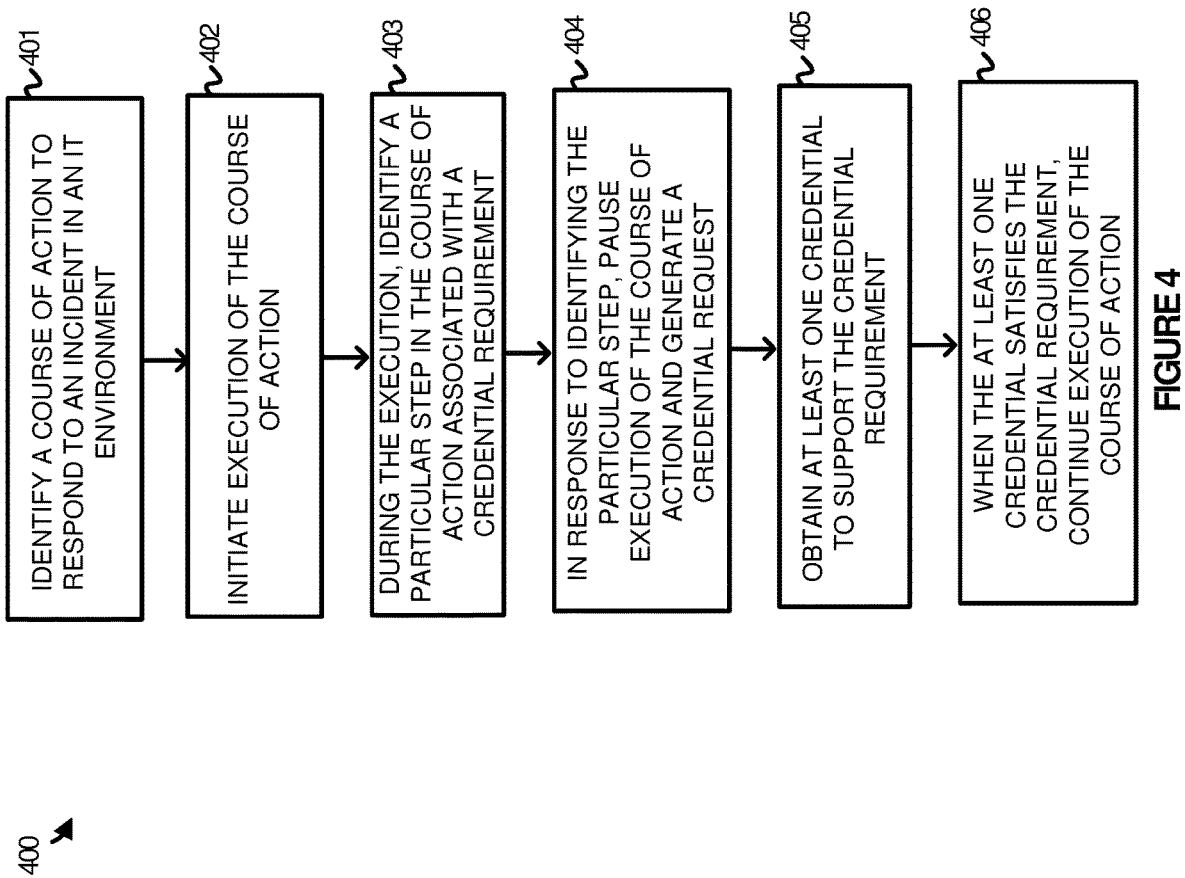

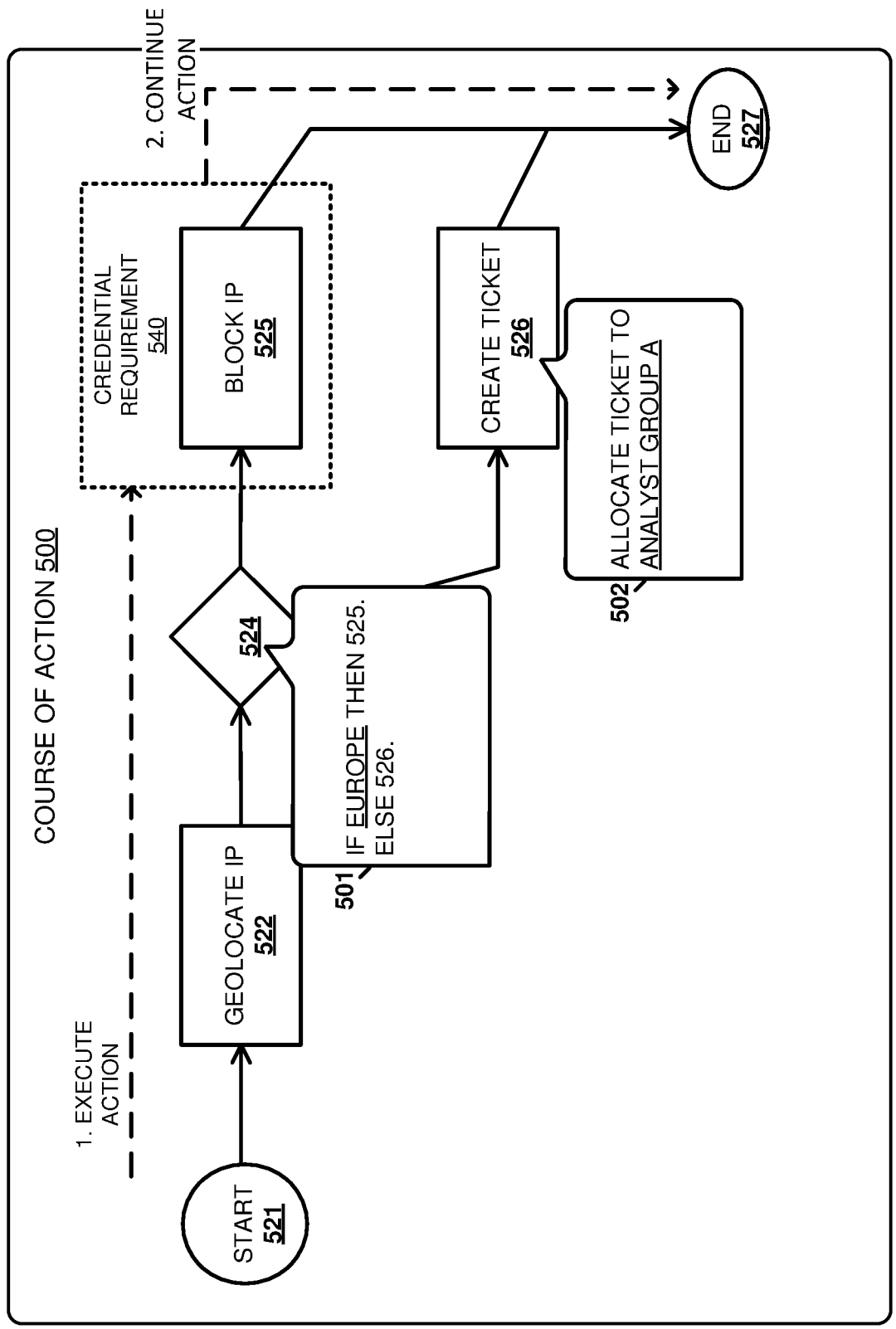

US 10,757,093 B1

IDENTIFICATION OF RUNTIME CREDENTIAL REQUIREMENTS

TECHNICAL BACKGROUND

Information technology (IT) environments often employ various computing components, both physical and virtual, to provide desired operations. These computing elements may include end user computing devices, host computing devices, containers, virtual machines, switches, routers, firewalls, and the like. To maintain efficient and effective operations of the IT environment, incident response services may be employed that can respond to various incidents within the IT environment. These incidents may include or be associated with viruses, malware, spyware, denial of service attacks, phishing attacks, server crashes, device failures, power outages, unknown communications, or some other similar incident.

However, while incident response services provide response operations to incidents within the IT environment, difficulties arise as the size and complexity of the IT environment increases. These difficulties are often compounded when the new computing components provide different operations and are configured with varying hardware and software configurations. Further, the increasing number computing components in combination with limited administrative personnel and resources can make it difficult to manage the investigation and remediation of incidents in the environment. Even with ample administrators or analyst users, it can be cumbersome to coordinate the investigation and remediation efforts.

Overview

The technology described herein improves incident response for an information technology (IT) environment. In one example, an incident service identifies a course of action to respond to an incident in the IT environment. Once identified, the incident service may identify traits of the steps that comprise the course of action, and determine credential requirements based on the traits. The incident service may further generate a request to obtain credentials to accommodate the credential requirement and execute the course of action.

BRIEF DESCRIPTION OF THE DRAWINGS

FIG. 4 illustrates an operation to improve incident response in an IT environment according to an implementation.

FIG. 5 illustrates a course of action with credential requirements according to an implementation.

DETAILED DESCRIPTION

Figure 1:
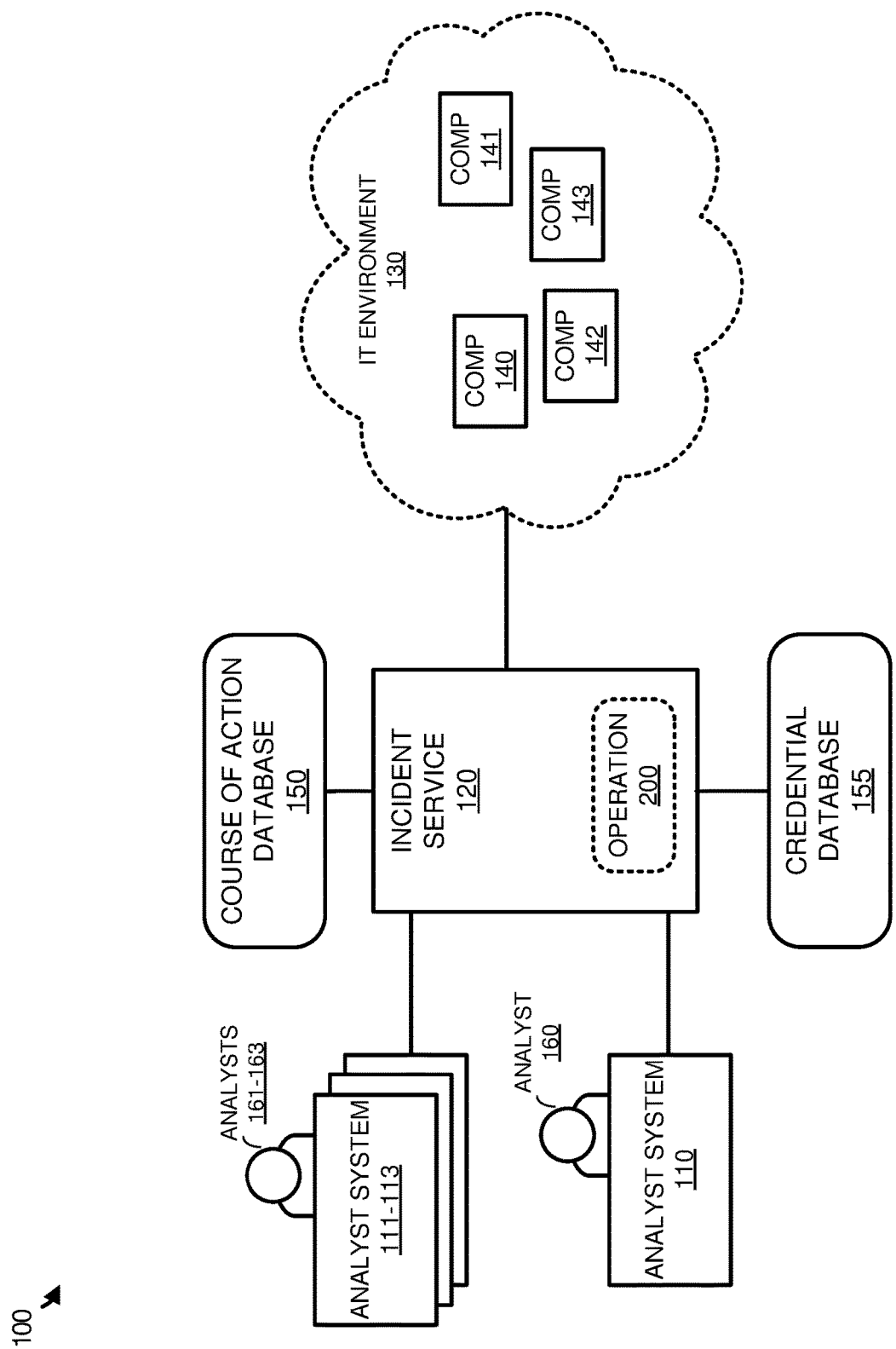
FIG. 1 illustrates a system for improved incident response in an information technology (IT) environment according to an implementation.

FIG. 1 illustrates a system 100 for improved incident response in an information technology (IT) environment according to an implementation. IT environment 100 includes analyst systems 110-113 with corresponding analysts 160-163, incident service 120, course of action database 150, credential database 155, and information technology (IT) environment 130. Analyst systems 110-113 may comprise smartphones, tablets, laptop computers, desktop computers, or some other similar computing device associated with a corresponding analyst of analysts 160-163. IT environment 130 includes components 140-143 that may comprise physical computing systems, virtual computing systems, routers, switches, firewalls, or some other similar types of computing or networking elements, including combinations thereof. Incident service 120 provides operation 200 that is further described in FIG. 2.

In operation, components 140-143 function in network 130 to provide various services and functionality. The services and functionality may include operations for performing as an end user computing system, a server computing system, a host for one or more virtual machines, a virtual machine itself, a switch, a router, or some other similar operation in the IT environment. During the operation of components 140-143, the components may encounter incidents, wherein the incidents may comprise or be associated with viruses, malware, spyware, denial of service attacks, phishing attacks, server crashes, device failures, power outages, unknown communications, or some other similar incident. To respond to the incidents, incident service 120 is provided that identifies the incident and provides a platform to respond to the incident. In at least one implementation, incident service 120 may implement courses of action the each comprise a flow of one or more steps, wherein the courses of action and the various steps may be used to mitigate, monitor, remove, or provide any other similar operations to remediate, correct, or otherwise respond to the incident.

In some examples, incident service 120 may implement security and event management (SIEM) services or monitoring and analytics services that are used to automate the identification of incidents within IT environment 130. In other implementations, the SIEM services or monitoring and analytics services may operate as a separate process or system from incident service 120 and provide information about identified incidents to incident service 120. As an example, if an unknown process were operating on component 140, a SIEM service, executing separately from incident service 120, may identify the incident and provide information about the incident to incident service 120. The information or data for the incident may include the name of the unknown process, the source of the process, any credential or licensing information about the unknown process, the component identifier for the component associated with the incident, or any other similar information about the incident.

In some implementations, in addition to or in place of the automated identification of an incident in IT environment 130, incident service 120 may employ a "ticket" system, wherein users and analysts of the environment may report incidents. For example, when an email is received from an unknown source seeking personal information, the receiving user of the email may report the email as an incident, such that incident service 120 may process the incident. When reported, the end user may provide information about the incident, however, automated processes may identify additional information for the incident, such as a source domain for the email, specific content or links within the email, or some other similar information that may assist incident service 120 in responding to the incident. This additional information may be determined from local databases or may be gathered from internet resources such as web services and other similar resources.

Once an incident is identified, one or more courses of action may be selected to respond to the incident. In some implementations, the courses of action may be selected by an analyst of analysts 160-163, however, incident service 120 may implement an automated course of action based on the incident type, components associated with the incident, users associated with the incident, or some other similar factor related to the current incident. Each of the courses of action may include one or more steps that may require credentials to implement the desired operation. These steps may obtain supplemental information for the incident, may modify a configuration of at least one component in IT environment 130, may compare traits of the incident to criteria or thresholds, may make decisions on which path of the course of action should be taken based on the traits, may generate operations to monitor the incident (e.g., packet capture operations), or may provide any other similar operation to respond to an incident. The credentials associated with the step may include usernames, passwords, keys, or some other similar credential to implement the required step. The credentials may be used to approve the step (e.g. approve a blocking of an IP address, migrate a virtual machine, or some other similar operation associated with the step), may be used to provide access to the required component (e.g. username and password to access a computing system), may be used to approve the entire course of action, may be used to verify a user type associated with the selection of the course of action or individual steps of the course of action, or may be used to provide any other similar operation. In some implementations, when a course of action is identified, incident service 120 may determine credential requirements related to the steps of the course of action and generate requests to obtain the required credentials. This request may occur prior to the execution or may occur during the execution of the course of action. For example, when the course of action is implemented and reaches a step associated with a credential requirement, the course of action may halt or pause until the required credentials are obtained.

Figure 2:
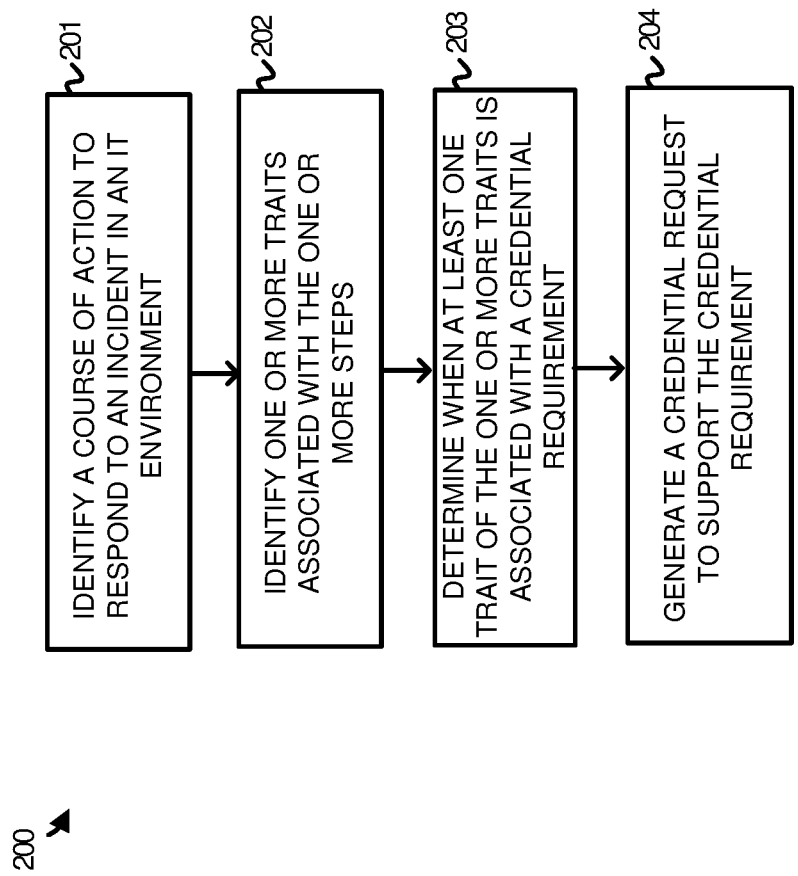
FIG. 2 illustrates an operation of an incident service to improve incident response in an IT environment according to an implementation.

FIG. 2 illustrates an operation 200 of an incident service to improve incident response in an IT environment according to an implementation. The processes of operation 200 are referenced parenthetically in the paragraphs that follow with reference to elements of system 100 of FIG. 1.

As depicted, incident service 120 may identify (201) a course of action to respond to an incident in IT environment 130. In some implementations, incident service 120 may identify the course of action based on attributes of the course of action and initiate automated implementation of the course of action in IT environment 130. In other implementations, an analyst of analysts 160-163 may be notified of the incident and select a course of action to respond to the incident. In selecting the incident, the analyst may select a course of action from course of action database 150, wherein course of action database 150 may maintain available courses of action to respond to incidents. In some examples, rather than selecting a preexisting course of action, the analyst may generate a new course of action, wherein the new course of action may be generated via an interface that permits a user to define a flow for steps to comprise a course of action. For example, a course of action may comprise a first step that obtains file reputation information related to a file associated with the incident, a second step that determines if the file reputation meets criteria, and a third step that implements an operation related to the file based on whether the file meets the criteria. Once the course of action is defined, the analyst may initiate execution of the course of action and may further store the course of action in course of action database 150 for use with later incidents.

After identifying the course of action, incident service 120 identifies (202) one or more traits associated with the one or more steps, determines (203) when at least one trait of the one or more traits is associated with a credential requirement, and generates (204) a credential request to support the credential requirement. The traits may comprise identifiers associated with the steps, components to be configured by the steps, a service (website or database) to be used in conjunction with a step, an identifier associated with the course of action, an identifier associated with a selecting analyst, an analyst type or role associated with the selecting analyst, a time stamp associated with the selection of the course of action, a threat level associated with IT environment 130, a criticality rating of a component to be modified by a step in the course of action, or some other similar trait associated with the one or more steps. In some implementations, incident service 120 may identify the traits and the credential requirements prior to executing the course of action. For example, if analyst 160 selected a course of action to respond to an incident, incident service 120 may determine that an identifier associated with the course of action corresponds to a credential requirement that requires a second analyst (supervisor or administrator) to provide credentials prior to implementation of the course of action. As a result, when the credentials are required, a credential request may be generated and incident service 120 may cause display of the credential request for at least one corresponding analyst of analysts 160-163. Once the credentials are obtained and verified, incident service 120 may initiate execution of the course of action.

In other implementations, during the execution of the course of action, incident service 120 may identify a step or steps that are associated with a credential requirement. As an example, a course of action may include a sequence of three steps. The first step may identify geographic location information about an IP address associated with the incident, the second step may determine whether the location information meets criteria, and the third step may configure a firewall when the location information meets the criteria. In this example, the first two steps of the course of action may not require credentials for execution, however, when the course of action reaches the third step, incident service 120 may pause the execution of the course of action to obtain the required credentials. In obtaining the required credentials, incident service 120 may generate a credential request and cause display of the credential request for an analyst of IT environment 130. After display, the analyst may provide the required keys, usernames, passwords, or any other similar credentials. Once the required credentials are obtained from an analyst associated with the course of action, incident service 120 may determine whether the obtained credentials satisfy the requirement and continue the execution of the course of action when the credentials satisfy the requirement. In some implementations, the credentials may be used to approve the execution of the step in the course of action (e.g., obtain approval from an analyst that selected the course of action, obtain approval of an analyst capable of approving the individual step, and the like), or may comprise credentials that are associated with the component (e.g. computing system login information, profile login information, and the like). Referring to the firewall example, the credentials may comprise user login information associated with the firewall, the credentials may comprise login credentials to access the configuration of the firewall. Once the credentials are obtained, the course of action may continue using the credentials to login to the firewall and implement any of the required modifications.

In some implementations, credential database 155 may maintain credentials required for the various components and services of IT environment 130. My maintaining the credentials, incident service 120 may identify when first traits are identified for a course of action and may access credential database 155 to implement the course of action without requiring additional credentials from an analyst of analysts 160-163. However, when second traits are identified for a course of action, incident service 120 may require that the credentials are obtained from an analyst of analysts 160-163 prior to implementing at least one step of the course of action. The different traits that might trigger the credential requirement from an analyst may include the threat level to IT environment 130 that may be determined based on local factors (e.g., the quantity of threats in IT environment 130, the severity of threats in IT environment 130, and the like) or factors obtained through external sources such as websites, the criticality rating of the component in relation the threat level, or some other similar trait related to the course of action when the course of action is executed. Advantageously, incident service 120 may require permissions when some traits are associated with the implementation of the course of action and may not require permissions when different traits are associated with the implementation of the course of action.

Figure 3A:
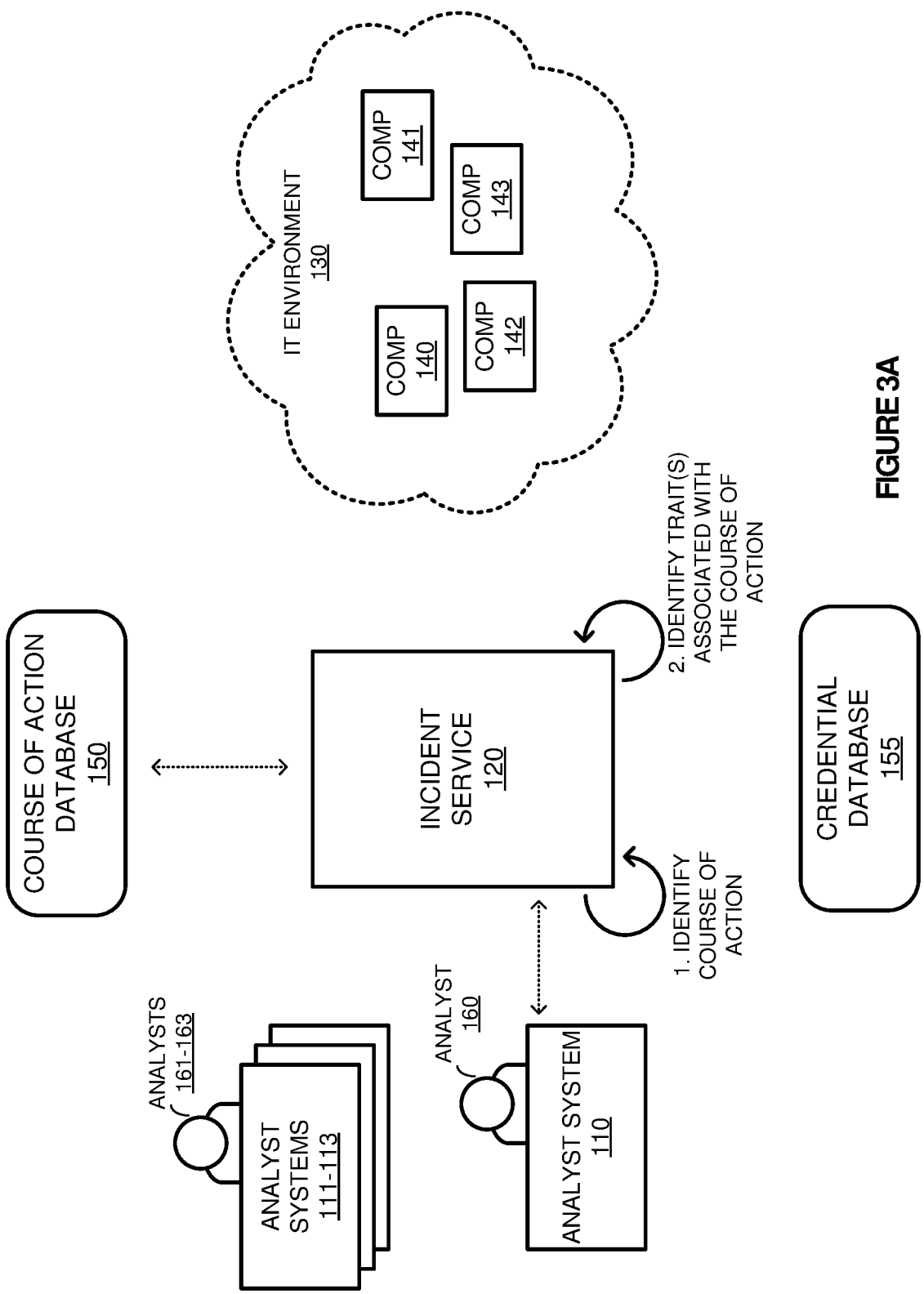
FIGS. 3A-3B illustrate an operational scenario of implementing a course of action according to an implementation.
Figure 3B:
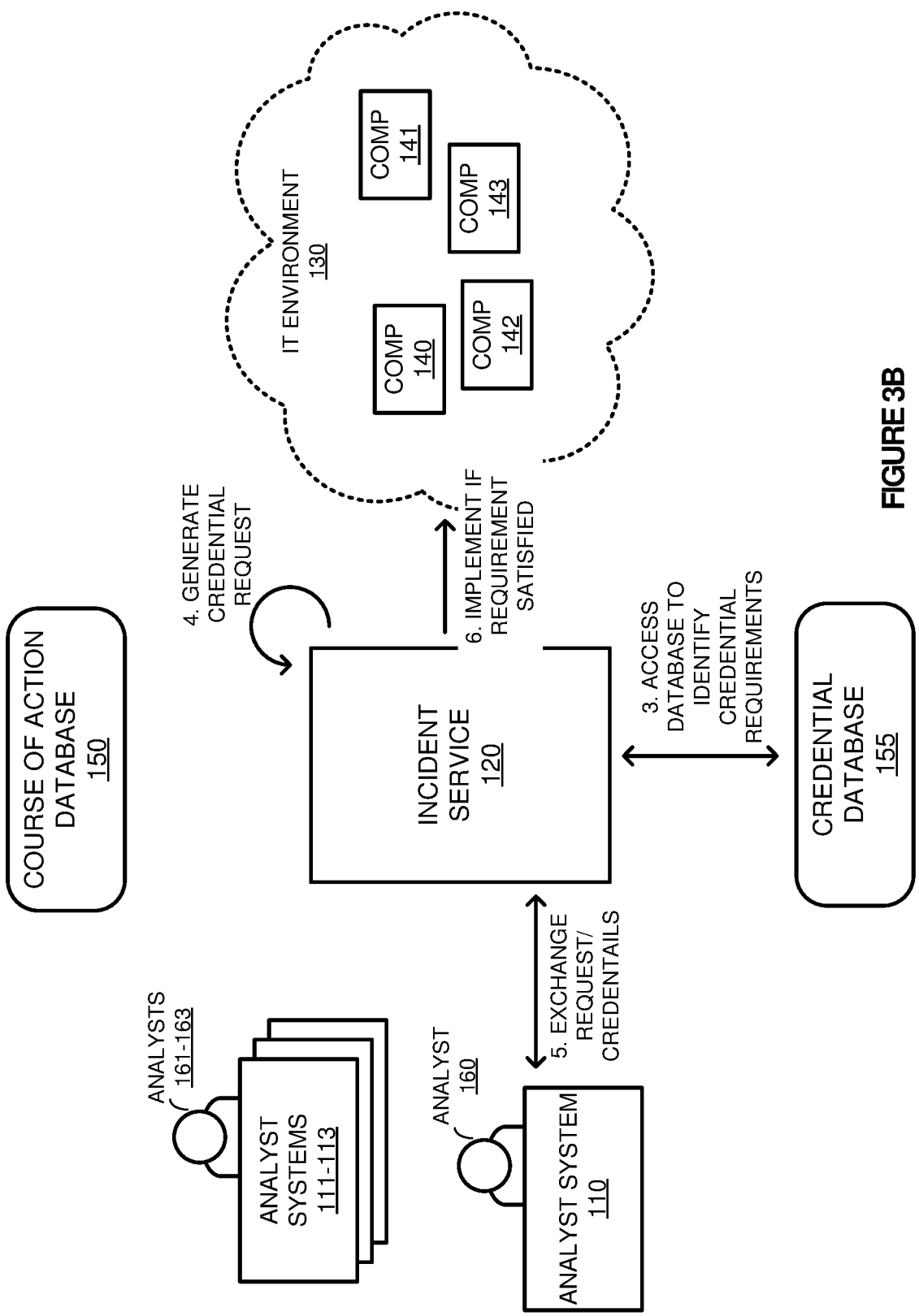

FIGS. 3A and 3B illustrate an operational scenario of implementing a course of action according to an implementation. FIGS. 3A and 3B include elements from system 100 of FIG. 1.

Referring first to FIG. 3A, incident service 120 identifies, at step 1, a course of action to respond to an incident in IT environment 130. The course of action may comprise an automated course of action or may comprise a course of action selected by an analyst, such as analyst 160. In some implementations, the course of action may be identified or selected from course of action database 150. In other implementations, analyst 160 may define sequencing information for the flow of steps that comprise the course of action. The sequencing information may be provided by a flow diagram, by text-based code or instructions, or by some other similar method of defining the course of action. Once a course of action is identified, incident service 120 identifies, at step 2, traits associated with the course of action, wherein the traits may comprise information about the types of steps in the course of action, an analyst initiating the execution of the course of action, components of IT environment 130 involved in the course of action, the time stamp of the request for the course of action, the threat level of the IT environment 130, or some other similar trait associated with the request for the course of action.

Turning to FIG. 3B, as the traits are identified for the steps of the course of action, incident service 120 accesses, credential database 155, to determine credential requirements associated with the traits. These credential requirements may be determined prior to the execution of the course of action or may be determined during the execution of the course of action. As an example, prior to executing the course of action, traits for the various steps may be identified and compared to credential requirements in credential database 155 to determine whether the course of action, or steps thereof, are associated with a credential requirement.

In other implementations, rather than determining credentials prior to the execution of the course of action, the course of action may initiate execution of the steps in the course of action and determine when a step is associated with a credential requirement. As an example, a course of action may include a flow of three sequential steps, wherein the first two steps may not be associated with a credential requirement, but the third step may be associated with a credential requirement to access a component in IT environment 130. Thus, the first two steps may execute prior to identifying the credential requirement for the third step, wherein the execution of the course of action may pause until the required credentials are provided.

When a credential requirement is identified, incident service 120 may generate, at step 4, a credential request, which is subsequently exchanged with analyst system 110, at step 5, wherein analyst 160 may provide at least one credential in response to the credential request. The credential may comprise a key, a username, a password, or some other similar credentials. The credentials may be used in approving at least one step in a course of action, accessing a component in IT environment 130, or provide some other similar operation with respect to the course of action. Once credentials are obtained, incident service 120 may implement or execute, at step 6, the course of action if the credential requirement is satisfied by the obtained credentials. In some implementations, when the credentials are obtained prior to initiating the execution of the course of action, incident service 120 may initiate execution of the course of action. In other implementations, where the credential requirements are identified for the steps of the course of action during the execution of the course of action, the course of action may pause the execution of at least a portion of the course of action that includes the step that triggered the credential requirement. Once the credentials are obtained from the required analyst, the course of action may resume execution. Thus, as an example, if a step of the course of action required a modification to a firewall of a computing component in IT environment 130, the course of action may pause execution until the required credentials for the computing component are provided by the analyst. Once provided, the execution may continue, using the credentials to access the component and implement the required modifications.

In some implementations, credential requirements may require credentials to be obtained from the same analyst that selected the course of action, however, the credentials may be obtained from an analyst assigned to approve specific steps in a course of action, an analyst or user associated with a component, or some other analyst for IT environment 130. Further, while a step in a course of action may require credentials during a first execution of a course of action, the credential requirement may be dynamic based on the current traits associated with the execution of the course of action. These traits may include the components involved of the course of action, the threat level to IT environment 130, the criticality level of the components for the course of action, or some other similar trait related to the course of action. Advantageously, while some executions of the course of action may require credential information, other executions may execute without the requirement of credentials based on traits associated with the execution.

FIG. 4 illustrates an operation 400 to improve incident response in an IT environment according to an implementation. The processes of operation 400 are referenced parenthetically in the paragraphs that follow to elements of system 100 of FIG. 1. Operation 400 is an example operation provided by incident service 120, however, incident service 120 may provide various other operations.

In providing operation 400, incident service 120 identifies (401) a course of action to respond to an incident in IT environment 130. Once the course of action is identified, incident service 120 initiates (402) execution of the course of action, wherein the course of action comprises a flow of one or more steps. These steps may obtain supplemental information for the incident, may modify a configuration of at least one component in IT environment 130, may compare traits of the incident to criteria or thresholds, may make decisions on which path of the course of action should be taken based on the traits, may generate operations to monitor the incident (e.g., packet capture operations), or may provide any other similar operation to respond to an incident. During the execution of the course of action, incident service 120 may identify (403) a particular step in the course of action that is associated with a credential requirement. In response to identifying the particular step, incident service 120 may pause (404) the execution of at least a portion of the course of action and generate a credential request to support the credential requirement.

As an example, a course of action may include two distinct and independent paths, wherein each of the paths include one or more steps for the course of action. If a step in a first path of the course of action is associated with a credential requirement, incident service 120 may pause the execution of the first path and generate a request to obtain the required credentials. Once the request is generated and provided by a user interface to an analyst associated with the course of action, incident service 120 may obtain (405) at least one credential to support the credential request. For instance, if a modification to a host computing system configuration required a username and password to access the host computing system, incident service may pause the course of action to implement the configuration modification and generate a request to obtain the required credentials. In some implementations, the request may be provided to an analyst that requested the implementation of the course of action, however, the request may be provided to an analyst associated with the component in some implementations. Once provided, incident service 120 may obtain the required credentials to support the credential requirement.

After obtaining the credentials, incident service 120 may determine whether the at least one credential satisfies the credential requirement and, when the at least one credential satisfies the credential requirement, continue (406) execution of the course of action. Referring to the example of multiple independent paths of the course of action, this resumption of the course of action may include resuming a path that corresponds to the step associated with the credential requirement. Thus, if a component required user login information, incident service 120 may continue the execution of the course of action when the credentials supplied by the analyst satisfy the requirements for the user login information.

FIG. 5 illustrates a course of action 500 with credential requirements according to an implementation. Course of action 500 is demonstrated as a flow diagram, however, a course of action may be defined using command languages, code, or some other similar operation to define the course of action. Course of action 500 includes steps for start 521, geolocate IP 522, decision 524, block IP 525, create ticket 526, and end 527. Course of action 500 may be defined by a user when an incident response is required or may be defined prior to an incident and stored in database to support the incident response when required.

In the example of course of action 500, start step 521 is followed by geolocate IP 522, wherein geolocate IP step 522 may obtain data from a service or database to provide information about the geolocation of an IP address associated with a particular incident. This information may comprise coordinates, a country code, or some other similar geolocation information corresponding to the IP address. Once the geolocation information is obtained, course of action proceeds to decision step 524, wherein decision step 524 provides operation 501 to determine whether the location corresponds to a European address or an address from another geolocation. If the address corresponds to a European address, course of action 500 proceeds to block IP step 525, wherein at least one component associated with the incident may block the IP address associated with the incident. In contrast, if the address corresponds to an address that is not from Europe, then course of action proceeds to create ticket step 526, wherein create ticket step 526 provides operation 502 to allocate the ticket to an analyst group for further processing. After the completion of block IP step 525 and create ticket step 526, course of action 500 proceeds to end step 527.

During the execution of the course of action block IP 525 is associated with credential requirement 540. Credential requirement 540 may be based on the step type for block IP step 525, may be based on the component on which block IP step 525 is to be implemented, may be based on the current threat level allocated to the IT environment, may be based on the analyst generating the request to implement course of action 500, may be based on the time stamp associated with the implementation of course of action 500, or may be based on any other similar determination. As an example, components of an IT environment may be allocated criticality rating and, based on the criticality rating, components with a higher criticality rating may require credentials, while assets with a lower criticality rating may not require credentials. This criticality rating may be allocated by administrator or analyst of the IT environment, may be based on the type of data on the component, the user or users of the component, or some other similar trait of the component. Here, when block IP step 525 is associated with a component with a criticality rating that meets criticality criteria, block IP step 525 may be associated with a credential requirement that requires an analyst to provide credentials to access and perform a configuration modification on the particular component.

In operation, when course of action 500 is identified for implementation, the incident service may initiate, at step 1, execution of the course of action. Once initiated, the incident service may identify when course of action 500 encounters a credential requirement, such as credential requirement 540. When encountered, the incident service may pause the execution of at least the path associated with the credential requirement and generate a request for at least one credential to support the request. Once the at least one credential is obtained, course of action 500 may resume, at step 2, execution the use of course of action using the at least one credential. In some implementations, the incident service may determine whether the at least one credential satisfies the credential requirement prior to continuing execution of the course of action (e.g. communicating with the associated component). In other implementations, the at least one credential may be supplied to a corresponding component or service by the incident service and the component or service may determine whether the credential requirement is satisfied. In some examples, when the at least one credential does not satisfy the credential requirement, the incident service may provide a notification to the associated analyst indicating that the credential requirement was not satisfied. This notification may indicate that at least a portion of the remaining course of action may not be implemented or may provide the analyst with the opportunity to supply different credentials.

In some execution examples of course of action 500, course of action 500 may not require a credential requirement. In particular, if the IP address associated with the incident does not correspond to a European IP address, then a credential may not be required and course of action 500 may execute without the requirement of credentials. Additionally, credential requirement 540 may depend on the component identifier, the component type, the time that the course of action was implemented, the threat level for the environment, the criticality of the component, the analyst role associated with the analyst selecting the course of action 500, or some other similar factor. Thus, in a first execution of the course of action block IP step 525 may be associated with a credential requirement, while during a second execution of the course of action block IP 525 may not be associated with a credential requirement.

Figure 6:
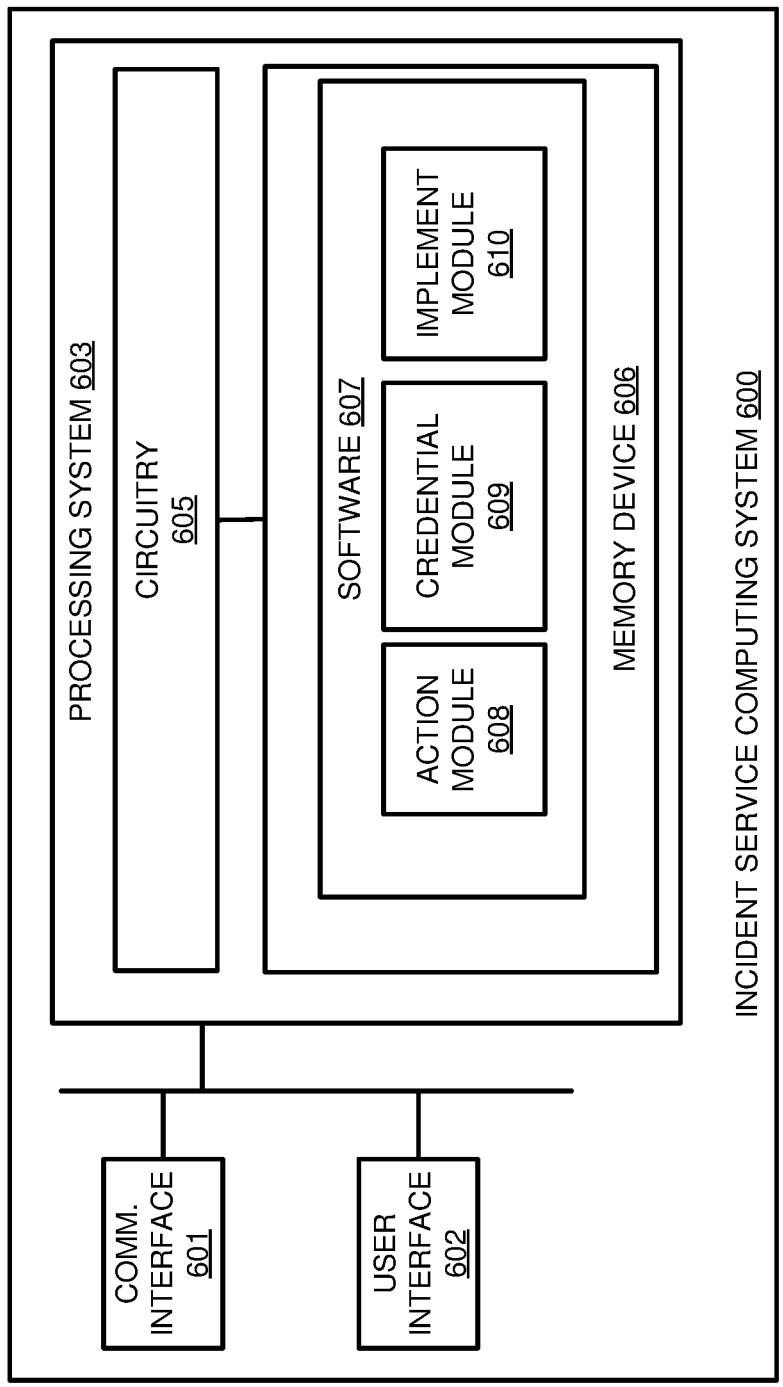
FIG. 6 illustrates an incident service computing system according to an implementation.

FIG. 6 illustrates an incident service computing system 600 according to an implementation. Computing system 600 is representative of any computing system or systems with which the various operational architectures, processes, scenarios, and sequences disclosed herein for an incident service may be implemented. Computing system 600 is an example of incident service 120 from FIG. 1, although other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may be used to communicate analyst consoles or systems, a STEM or other similar monitoring service, and may further communicate with components within the IT environment.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples. In some implementations, user interface 602 may operate as an analyst system to provide information about incidents to at least one analyst.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory, but in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes action module 608, credential module 609, and implement module 610, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In at least one implementation, action module 608 directs processing system 603 to identify a course of action to respond to an incident in an IT environment, wherein the course of action may comprise a flow of one or more steps. In some implementations, the course of action may be defined by an analyst, wherein the analyst may use a flow diagram to connect and provide sequencing information to represent the flow of steps of the course of action. Once the course of action is identified, credential module 609 may identify traits associated with the steps of the course of action and determine whether one or more of the steps correspond to a credential requirement.

In some examples, the determination of whether a step corresponds to a credential requirement may occur prior to the execution of the course of action. For example, credential module 609 may determine traits of the various steps in the course of action and determine whether the traits correspond to a credential requirement. These traits may include the role of the analyst that selected the course of action, the time stamp associated with the action selection, the step type associated with the step (e.g. enrichment information gathering step, component configuration modification step, and the like), the current threat level associated with IT environment, the criticality rating associated with the component to be modified by the step, or some other similar trait including combinations thereof. When a step is identified for requiring a credential requirement, a credential request may be generated to obtain the credentials from an analyst associated with the IT environment. Once the credentials are obtained, implement module 610 may execute the course of action in accordance with the credentials, wherein the credentials may provide approval for steps of the course of action, provide login information for components, or provide some other similar credential for the course of action. Although credential requirements may be identified for the individual steps, incident service computing system 600 may obtain credentials for the entire course of action in some examples. For example, based on the type of course of action selected, credential module 609 may generate a credential request to ensure that the analyst role can implement and initiate the course of action.

In other implementations, rather than determining the credential requirements of the course of action prior to the execution of the course of action, credential module 609 may identify traits and associated credential requirements during the execution of the course of action. As described herein, a course of action may include a flow of steps to provide a desired operation, wherein the flow may include one or more paths. When the course of action reaches a step that is associated with a credential requirement, at least a portion of the course of action may paused, while the credentials are obtained from an associated analyst of the IT environment. In some examples, credential module 609 may pause only paths that are dependent on the credentials for their operations, while permitting unrelated or independent paths of the course of action to continue execution. Once the credentials are obtained, implement module 610 may resume execution of at least the pause portion of the course of action using the credentials supplied from the analyst.

In some implementations, computing system 600 may determine when the supplied credentials from the analyst are valid. In other implementations, computing system 600 may provide the credentials to the component in the IT environment to determine whether the credentials are valid. When the credentials are valid, the course of action may continue execution until the course of action is completed or until another credential requirement is encountered. When the credentials are not valid or do not support the credential request, computing system 600 may generate a notification for an analyst associated with the course of action, wherein the notification may indicate a request for different credentials, may indicate that the course of action could not be completed, or may provide any other information about the failure of the credential in satisfying the requirement.

Returning to the elements of FIG. 1, analyst systems 110-113, incident service 120, course of action database 150, and credential database 155 may each comprise communication interfaces, network interfaces, processing systems, computer systems, microprocessors, storage systems, storage media, or some other processing devices or software systems, and can be distributed among multiple devices. Examples of analyst systems 110-113, incident service 120, course of action database 150, and credential database 155 can include software such as an operating system, logs, databases, utilities, drivers, networking software, and other software stored on a computer-readable medium. Analyst systems 110-113, incident service 120, course of action database 150, and credential database 155 may comprise, in some examples, one or more server computing systems, desktop computing systems, laptop computing systems, or any other computing system, including combinations thereof.

IT environment 130 includes computing components 140-143, which may include physical computing systems (host computing systems, user devices, and the like), virtual computing systems, such as virtual machines and containers, routers, switches, and other similar computing systems.

Communication between analyst systems 110-113, incident service 120, course of action database 150, credential database 155, and components within IT environment 130 may use metal, glass, optical, air, space, or some other material as the transport media. Communication between analyst systems 110-113, incident service 120, course of action database 150, credential database 155, and components within IT environment 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between analyst systems 110-113, incident service 120, course of action database 150, credential database 155, and components within IT environment 130 may use direct links or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method implemented by an incident service computing system, the method comprising:
   obtaining, by the incident service computing system, an indication of an incident in an IT environment, the IT environment including a plurality of computing assets, the incident encountered in one or more of the plurality of computing assets in the IT environment;
   selecting, by the incident service computing system, a course of action, from a plurality of courses of action, to respond to the incident in the IT environment, wherein the course of action is selected based on a parameter associated with the incident, wherein the course of action comprises one or more steps, and wherein the incident service computing system issues the one or more steps to the plurality of computing assets for execution by the plurality of computing assets;
   during execution of the course of action, determining, by the incident service computing system, prior to execution of a particular step of the one or more steps, that the particular step of the one or more steps is associated with a credential requirement based on one or more traits associated with the particular step;
   generating, by the incident service computing system, a credential request to satisfy the credential requirement;
   obtaining, by the incident service computing system, a credential in response to the credential request; and
   resuming, by the incident service computing system, execution of the course of action, wherein the resuming includes using the credential to perform the particular step.

2. The method of claim 1 further comprising:
   causing display of the credential request.

3. The method of claim 2
   wherein resuming execution of the course of action further comprises:
      determining that the credential satisfies the credential requirement; and
      when the credential requirement is satisfied, continuing the execution of the course of action.

4. The method of claim 2 further comprising:
wherein resuming execution of the course of action further comprises:
determining that the credential fails to satisfy the credential requirement; and
when the credential fails to satisfy the credential requirement, preventing execution of at least a portion of the course of action.

5. The method of claim 1, wherein the credential requirement comprises at least a username and password.

6. The method of claim 1 further comprising receiving input to generate the course of action, wherein the input defines sequencing information for the one or more steps.

7. The method of claim 1, wherein the one or more traits comprise an identifier associated with the particular step.

8. The method of claim 1, wherein the one or more traits comprise at least one component identifier associated with components with configurations to be modified by the particular step.

9. The method of claim 1, wherein selecting the course of action comprises receiving a selection of the course of action, wherein the one or more traits comprise an analyst associated with the selection.

10. The method of claim 9, wherein the method further comprises:
causing display of the credential request on a device associated with the analyst,
wherein the credential is obtained in response to the display.

11. The method of claim 1, wherein selecting the course of action comprises receiving a selection of the course of action, and wherein the one or more traits comprise a time stamp associated with the selection.

12. The method of claim 1, wherein selecting the course of action comprises receiving a selection of the course of action, and wherein the one or more traits comprise a role of an analyst associated with the selection.

13. The method of claim 1, wherein the one or more traits comprise a threat level associated with the IT environment.

14. The method of claim 13, wherein the threat level is determined based on a quantity of incidents identified in the IT environment, sources of incidents in the IT environment, or types of incidents in the IT environment.

15. The method of claim 1, wherein selecting the course of action comprises receiving a selection of the course of action, and wherein the method further comprises:
causing display of the credential request, wherein the credential requirement is associated with a component of the IT environment or an approval of the particular step.

16. A system comprising:
a processor;
a non-transitory computer readable storage medium storing instructions which,
when executed by the processor, cause the processor to:
obtain an indication of an incident in an IT environment, the IT environment including a plurality of computing assets, the incident encountered in one or more of the plurality of computing assets in the IT environment;
select a course of action, from a plurality of courses of action, to respond to the incident in the information technology (IT) environment, wherein the course of action is selected based on a parameter associated with the incident, wherein the course of action comprises one or more steps, and wherein the system issues the one or more steps to the plurality of computing assets for execution by the plurality of computing assets;
during execution of the course of action, determine one or more traits associated with the one or more steps;
determine, prior to execution of a particular step of the one or more steps, that the particular step of the one or more steps is associated with a credential requirement based on one or more traits associated with the particular step;
generate a credential request to satisfy the credential requirement;
obtain a credential to satisfy the credential request in response to the credential request; and
resume execution of the course of action, wherein the resuming includes using the credential to perform the particular step.

17. The system of claim 16, wherein the instructions, when executed by the processor, further cause the processor to:
initiate execution of the course of action; and
in response to the course of action reaching the particular step, pause execution of a path in the course of action associated with the particular step.

18. The system of claim 16, wherein the instructions, when executed by the processor, further cause the processor to cause display of the credential request.

19. The system of claim 16, wherein the instructions, when executed by the processor, further cause the processor to, when the credential fails to satisfy the credential requirement, generate a notification indicating a failure to satisfy the credential requirement.

20. The system of claim 16, wherein the one or more traits comprise one or more identifiers associated with the one or more steps.

21. The system of claim 16, wherein the one or more traits comprise one or more component identifiers associated with components to be modified by the one or more steps.

22. The system of claim 16, wherein the one or more traits comprise a threat level associated with the IT environment.

23. A non-transitory computer readable storage medium storing instructions which, when executed by a processor, cause the processor to perform operations comprising:
obtaining an indication of an incident in an IT environment, the IT environment including a plurality of computing assets, the incident encountered in one or more of the plurality of computing assets in the IT environment;
selecting a course of action, from a plurality of courses of action, to respond to the incident in the information technology (IT) environment, wherein the course of action is selected based on a parameter associated with the incident, wherein the course of action comprises one or more steps to be issued to and executed by the plurality of computing assets in the IT environment;
during execution of the course of action, determining, prior to execution of a particular step of the one or more steps, that the particular step of the one or more steps is associated with a credential requirement based on one or more traits associated with the particular step;
generating a credential request to satisfy the credential requirement;
obtaining a credential in response to the credential request; and resuming execution of the course of action, wherein the resuming includes using the credential to perform the particular step.

24. The non-transitory computer readable storage medium of claim 23, wherein the instructions further cause the processor to perform operations comprising:
    causing display of the credential request; and
    wherein resuming execution of the course of action comprises:
        determining that the credential satisfies the credential requirement; and
        when the credential requirement is satisfied, continuing the execution of the course of action.

25. The non-transitory computer readable storage medium of claim 23, wherein the credential requirement comprises at least a username and password.

26. The non-transitory computer readable storage medium of claim 23, wherein the instructions further cause the processor to perform operations comprising receiving input to generate the course of action, wherein the input defines sequencing information for the one or more steps.

27. The non-transitory computer readable storage medium of claim 23, wherein the one or more traits comprise an identifier associated with the particular step.

28. The non-transitory computer readable storage medium of claim 23, wherein the one or more traits comprise at least one component identifier associated with components with configurations to be modified by the particular step.

29. The non-transitory computer readable storage medium of claim 23, wherein selecting the course of action comprises receiving a selection of the course of action, wherein the one or more traits comprise an analyst associated with the selection.

30. The non-transitory computer readable storage medium of claim 23, wherein the one or more traits comprise a threat level associated with the IT environment.

* * * * *